V. HENRI, A. HELBRONNER & M. VON RECKLINGHAUSEN.
APPARATUS FOR THE TREATMENT OF WATER AND OTHER LIQUIDS BY ULTRA VIOLET RAYS.
APPLICATION FILED NOV. 10, 1913.

1,200,940.

Patented Oct. 10, 1916.

V. HENRI, A. HELBRONNER & M. VON RECKLINGHAUSEN.
APPARATUS FOR THE TREATMENT OF WATER AND OTHER LIQUIDS BY ULTRA VIOLET RAYS.
APPLICATION FILED NOV. 10, 1913.

1,200,940.

Patented Oct. 10, 1916.

V. HENRI, A. HELBRONNER & M. VON RECKLINGHAUSEN.
APPARATUS FOR THE TREATMENT OF WATER AND OTHER LIQUIDS BY ULTRA VIOLET RAYS.
APPLICATION FILED NOV. 10, 1913.

1,200,940.                                     Patented Oct. 10, 1916.
                                                      5 SHEETS—SHEET 3.

V. HENRI, A. HELBRONNER & M. VON RECKLINGHAUSEN.
APPARATUS FOR THE TREATMENT OF WATER AND OTHER LIQUIDS BY ULTRA VIOLET RAYS.
APPLICATION FILED NOV. 10, 1913.

1,200,940.  Patented Oct. 10, 1916.
5 SHEETS—SHEET 4.

V. HENRI, A. HELBRONNER & M. VON RECKLINGHAUSEN.
APPARATUS FOR THE TREATMENT OF WATER AND OTHER LIQUIDS BY ULTRA VIOLET RAYS.
APPLICATION FILED NOV. 10, 1913.

1,200,940.

Patented Oct. 10, 1916.
5 SHEETS—SHEET 5.

UNITED STATES PATENT OFFICE.

VICTOR HENRI, OF PARIS, AND ANDRÉ HELBRONNER AND MAX von RECKLING-HAUSEN, OF SURESNES, FRANCE, ASSIGNORS, BY MESNE ASSIGNMENTS, TO THE R. U. V. COMPANY, INC., A CORPORATION OF NEW YORK.

APPARATUS FOR THE TREATMENT OF WATER AND OTHER LIQUIDS BY ULTRA-VIOLET RAYS.

1,200,940.     Specification of Letters Patent.     Patented Oct. 10, 1916.

Original application filed October 31, 1910, Serial No. 589,995. Divided and this application filed November 10, 1913. Serial No. 800,049.

*To all whom it may concern:*

Be it known that we, VICTOR HENRI, a citizen of the French Republic, residing at Paris, France, ANDRÉ HELBRONNER, a citizen of the French Republic, residing at Suresnes, France, and MAX VON RECKLINGHAUSEN, a subject of the German Emperor, residing at Suresnes, France, have invented a new and useful Improvement in Apparatus for the Treatment of Water and other Liquids by Ultra-Violet Rays, of which the following is a specification, this application being a division of application Serial No. 589,995, filed October 31, 1910.

This invention relates to the treatment and sterilization of liquids by means of ultra-violet rays, and particularly to the sterilization of such liquids as are only slightly or not at all opaque to the rays, and has for its object the construction of apparatus suitable for the purpose.

Sterilization apparatus of two different types has been previously described in the first of which the source of ultra-violet rays is located above the liquid to be sterilized, and in the second of which the source of the rays is submerged in the liquid. In the first case, which can be applied in a simple way only to liquids which are not under pressure, some of the rays are emitted in directions other than toward the liquid which is being sterilized, and therefore the apparatus is not as efficient as would otherwise be the case. On the other hand, in apparatus where a lamp constituting the source of rays is itself submerged in the liquid which is being sterilized it necessarily operates with a very low efficiency on account of the cooling of the lamp by the liquid; moreover the lamps are not easily accessible and it is also difficult to cause them to start automatically by the magnetic tilting method. Furthermore, when water is being sterilized deposits of mineral matter of a nature similar to boiler crusts are formed on the lamp tube which interfere with the passage of the ultra-violet rays.

In our application for Letters Patent Serial No. 565611, we have described apparatus in which the liquid, for instance water, is sterilized by means of sources of ultraviolet rays which are placed above the liquid and in our application for Letters Patent Serial No. 565612 we have described a method of sterilizing liquids in which the source of the ultra-violet rays is immersed in the same, and in the preferred form of construction the mercury vapor lamp used as a source for the rays is inclosed in a quartz envelop, the space between the lamp and the outer envelop being exhausted to a high vacuum. Now it will be obvious that as the ultra-violet rays penetrate more deeply into the water, they become less active and therefore the parts of the water nearest the ultra-violet rays will be acted upon to a greater extent than those parts which are farther away. In order, therefore, to secure uniformity of action on the total bulk of water treated, it is desirable to provide means for circulating the water through the apparatus, so that all parts of the same are acted upon to the necessary extent, and as far as possible to an equal degree. For this reason the water should in many cases be circulated to and fro within the sphere of action of the ultra-violet rays and guides or baffle plates may be provided for the purpose. Care should be taken, however, to so arrange the parts that such guides or baffle plates do not shelter any parts of the water from the rays. This object can generally be accomplished by arranging the baffle plates in a radial direction with reference to the position of the source of the ultra-violet rays employed.

It will be apparent that the bactericidal effect of the ultra-violet rays will be all the more energetic the nearer the bacteria are to the source of the rays. In sterilizing a current of water flowing through a trough it is therefore desirable to regulate the duration of exposure of each component part of the current according to its distance from the source of rays. If all the liquid were to flow underneath a lamp at a uniform speed, the duration of exposure would need to be regulated so as to completely sterilize those parts of the liquid which pass farthest remote from the lamp and this would cause an excessive expenditure of energy for the liquid immediately below the lamp. For the sake of economy it is therefore desirable to regulate the speed of the current of water in such a manner that the liquid nearest to the source of the rays flows at a greater speed than liquid which is more remote from said source.

The ultra-violet rays for the purpose of our invention may be derived from any convenient source. Preferably we use mercury vapor lamps having a container made of quartz, which is permeable to the ultra-violet rays. Such lamps are now well known and furnish the most powerful source of ultra-violet rays available at the present day. Some of these lamps, as at present constructed, require to be tilted in order to operate them at starting, and a device must, therefore, be arranged for doing this from the exterior of the apparatus in those cases where the lamps are not easily accessible. Any of the well known automatic tilting devices may be employed if desired, and a convenient form of such device comprises a solenoid, the armature of which is connected to one end of the lamp. When the lamp circuit is closed the solenoid raises the end of the lamp and causes the latter to start, and when this has been done, the shunt circuit leading to the solenoid is automatically opened.

In apparatus in which the source of the ultra-violet rays is immersed in the liquid, it is desirable that the lamp should be easily accessible and that means should be provided for starting the same by the magnetic tilting method. For this reason the lamp should be supported in a special lamp chamber and in apparatus of this type water under pressure may be sterilized and the greater part of the ultra-violet rays utilized. The lamp chamber is inserted in the sterilizing tank either from the top or from the side, and the chamber is provided with windows permeable to ultra-violet rays surrounding that part of the lamp which emits such rays. The apparatus so constructed permits of automatic operation, is inexpensive to construct, efficient in operation, and allows of the lamp being readily attended to or replaced in case of defects. Baffle plates can be arranged in the sterilizing tank preferably in a radial direction from the lamp so that the liquid flowing therethrough is directly submitted to the influence of the rays passing through the windows.

If desired a vacuum may be created in the lamp chamber and the lamp can be controlled from the outside of the same because provision can be made in the lamp chamber for automatically starting the lamp either by the use of magnetic tilting apparatus or a high tension device. The quartz windows of the lamp chamber may be constructed from plates of rock crystal, and one plate may be used for each window although in cases where large windows are required each may be built up like a stained glass window from plates of rock crystal secured together with binding strips. Instead of using plates of rock crystal the part of the lamp tube which emits ultra-violet rays may be surrounded by a channel or tube of quartz cut out of rock crystal or made by fusing together pieces of quartz of suitable shape in the oxyhydrogen blow-pipe flame. The quartz can also be molded in the molten state in order to obtain the desired shape of tube or channel. The sterilizing conduit may also be constructed with tubular windows which surround the part of the lamp which emits ultra-violet rays.

The apparatus provided with a lamp chamber or tubular windows is particularly suitable for sterilizing water under pressure because the lamp may be caused to operate either at atmospheric pressure or in a vacuum or under pressure as desired.

As indicated above in sterilizing a current of liquid flowing through a trough it is desirable to regulate the duration of exposure of each component part of the current according to its distance from the source of the rays, and this also applies in the case of a closed conduit. Baffle plates may therefore be arranged at suitable positions in the conduit, the liquid passing above, below, or at the side of said baffle plates. The shape of the baffle plate can be made so as to obtain a frictional retardation of the liquid wherever it is required. The conduit itself may also be narrowed down near the lamps and widened out away from the lamps, so that the speed of the liquid is greatest just as it is passing a lamp and in that part of the conduit in immediate proximity to the lamp.

In order that the nature of our invention may be clearly understood, we will now proceed to describe the same with reference to the accompanying drawings in which—

Figs. 5 and 6 show in vertical section modifications of the apparatus shown in Fig. 1 and Figs. 7 and 8 illustrate the manner in which the lamp chamber or quartz windows are attached to the sterilizing chamber, Fig. 7 being a sectional view and Fig. 8 a view in elevation of said apparatus. Fig. 21 is a perspective view of a sterilizing conduit adapted to regulate the speed of the liquid which is being treated, Fig. 22 being a cross section on the line XXII—XXII Fig. 21 while Fig. 26 is an end view in sectional elevation of a modified form of the apparatus shown in Fig. 6 and Figs. 27 and 28 are side and end views respectively of sectional elevations of a further modification, the section for Fig. 27 being taken on the line XXVII—XXVII of Fig. 28.

Referring now to Figs. 1 to 4 the sterilizing apparatus comprises an outer chamber or casing 1 provided with baffle plates 2 for guiding the water in a circuitous path through the apparatus. This chamber is provided with an opening 3 at the top through which the lamp chamber 4 is inserted. The lamp chamber 4 is constructed to accommodate the lamp 5 which is arranged longitudinally in the lower part. The lamp chamber is narrowed alongside the luminous tube of the lamp and is provided with three quartz windows 6, one at each side and one underneath the lamp, or these three sides may be replaced by one quartz channel. Pockets 7 are provided for receiving the two ends 8 of the lamp. The lamp 5 is pivotally suspended at one end by means of a collar from the bracket 9 mounted on the wall of the lamp chamber. The other end of the lamp is pivotally connected to a rod 10 which is attached to the armature 11 of an electro-magnet 12 also mounted in the lamp chamber. The lamp chamber is provided with flanges 13 adapted to fit closely over the edges 14 of the opening of the sterilizing chamber and a cover 15 is provided for the top of the lamp chamber. The liquid, water for example, is admitted to the apparatus through the opening 16 and flows in the direction shown by the arrows until it reaches the outlet 17. An advantage of this construction which is of considerable importance commercially is that the lamp chamber is readily removed from the remainder of the apparatus so that the quartz windows can be cleaned and attended to when necessary and the lamp is very easily accessible. A useful feature associated with this and some of the other forms of apparatus herein described is that the liquid is caused by means of the baffle plates to change its direction of flow while exposed to the rays. Thus, particles of dust and the like are turned over and microbes which might find shelter behind such particles come within the sphere of action and are destroyed.

It will be observed that the baffle plates 2 are arranged radially from the lamp so that no shadows are formed and the liquid which is being sterilized is at all times directly exposed to the ultra-violet rays.

Figure 1:
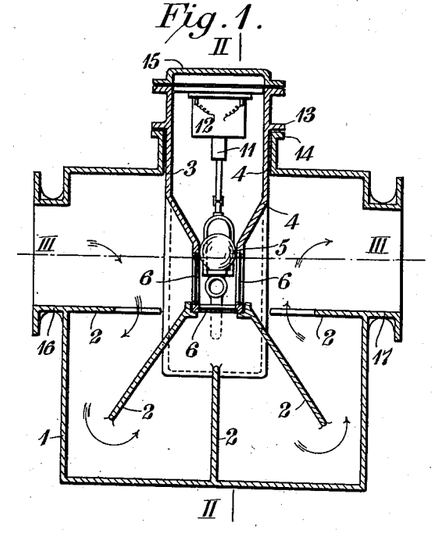
Figure 1 is a sectional elevation of a sterilizing apparatus constructed in accordance with the present invention.
Figure 2:
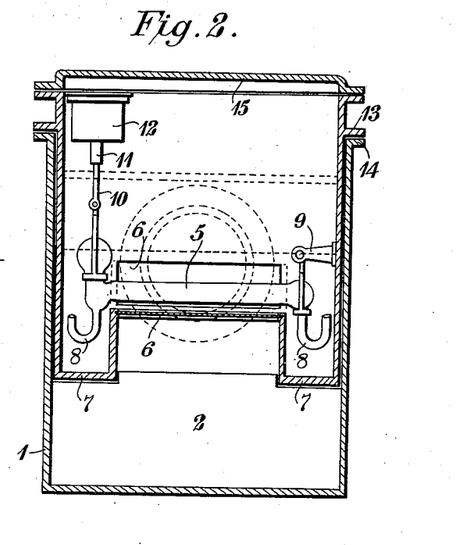
Fig. 2 is a vertical section on the line II—II of Fig. 1.
Figure 3:
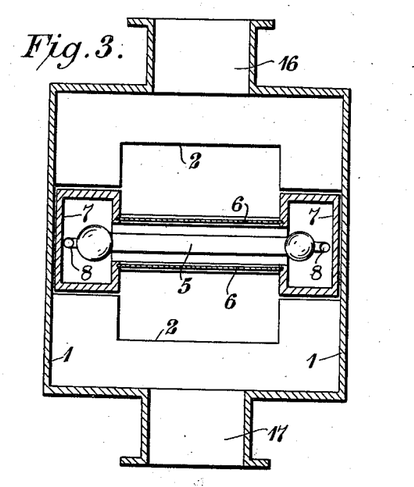
Fig. 3 is a horizontal section on the line III—III of Fig. 1.
Figure 4:
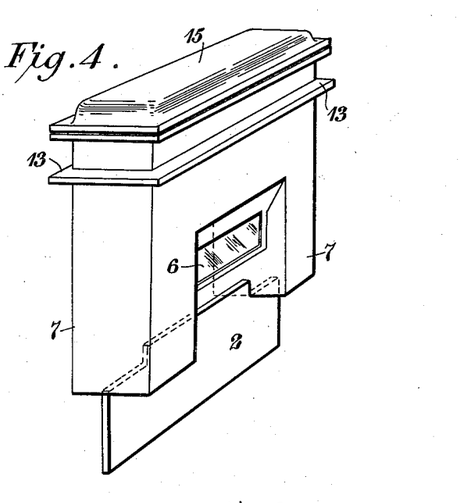
Fig. 4 is a perspective view of the lamp chamber and one of the baffle plates separated from the remaining parts of the apparatus of Fig. 1.
Figure 5:
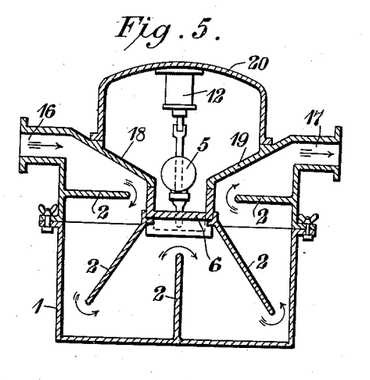

In Fig. 5 there is shown a modified form of construction of the apparatus above described with reference to Figs. 1 to 4. It comprises a sterilizing tank 1 provided with baffle plates 2. The top of the sterilizing tank is formed by two sides 18 and 19 which slope downward toward the middle, leaving an opening where the quartz channel or windows 6 is or are mounted. The lamp chamber or hood 20 is mounted on the sterilizing tank with hermetically tight joints and is constructed so that it can be removed from the sterilizing tank 1, and the lamp 5 is mounted therein, an automatic electro-magnetic tilting device 12 being provided for operating the lamp at starting. If desired a vacuum may be created in the lamp chamber. The liquid, for instance water, is admitted through the inlet 16 and passes in the direction shown by the arrows through the apparatus, whereby it is exposed to the ultra-violet rays emitted by the lamp which penetrate through the windows 6. The liquid after sterilization is delivered through the outlet 17.

Figure 6:
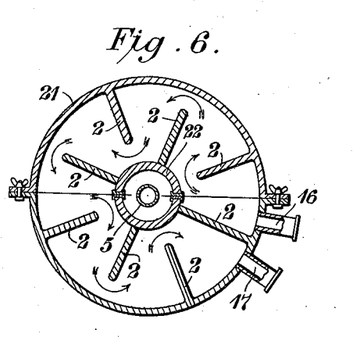

Fig. 6 shows a development of the forms of construction already described with reference to Figs, 1–5. In this case the chamber 21 has a cylindrical form and the lamp 5 is supported in a chamber or tubular window 22 located axially in the middle of the cylindrical chamber. Baffle plates 2 are provided alternately on the walls of the tank and the lamp chamber as shown. The inlet 16 is situated near to the outlet 17 but separated therefrom by the partition 23 so that the liquid in passing through the apparatus makes a complete circle around the lamp chamber, and at the same time makes a circuitous or zigzag path as shown by the arrows, on account of the baffle plates 2. The sterilizing chamber 21 and the lamp chamber 22 may be divided longitudinally as indicated for convenience in assembling the parts in position around the lamp.

Figure 7:
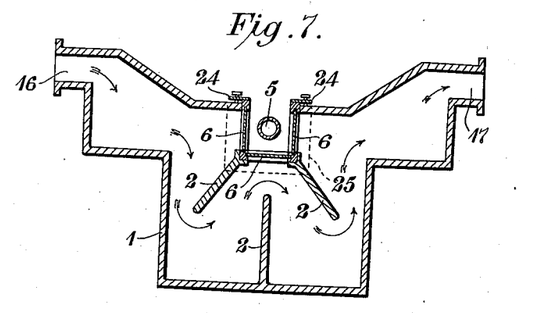
Figure 8:
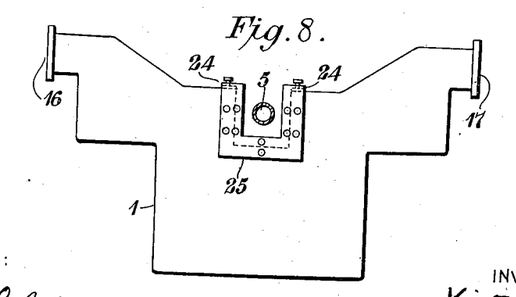

Figs. 7 and 8 show how a lamp chamber somewhat similar to that illustrated in Fig. 5 may be secured in the sterilizing tank. The upper flange 24 is bolted to the edges of the sterilizing tank and side flanges 25 are provided on the ends of the lamp chamber which project through the sides of the tank, these side flanges being clamped to the sides of the tank with suitable packing to prevent leakage.

Figures 9, 12:
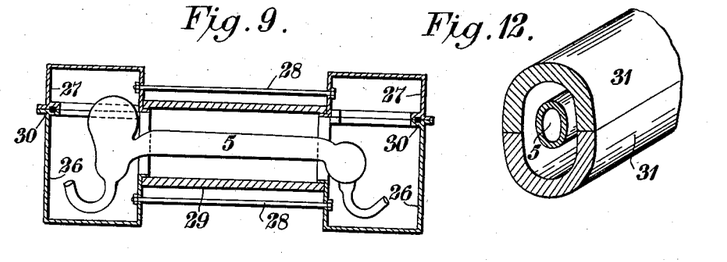
Fig. 9 shows in vertical section a form of construction of a lamp chamber and Figs. 10 and 11 show in perspective the lower and upper sections respectively of the same.
Figs. 12, 13 14 and 15 show in perspective different shapes of tubular windows which may be used for surrounding the part of the lamp which emits ultra-violet rays.
Figures 10, 11, 13, 14, 15:
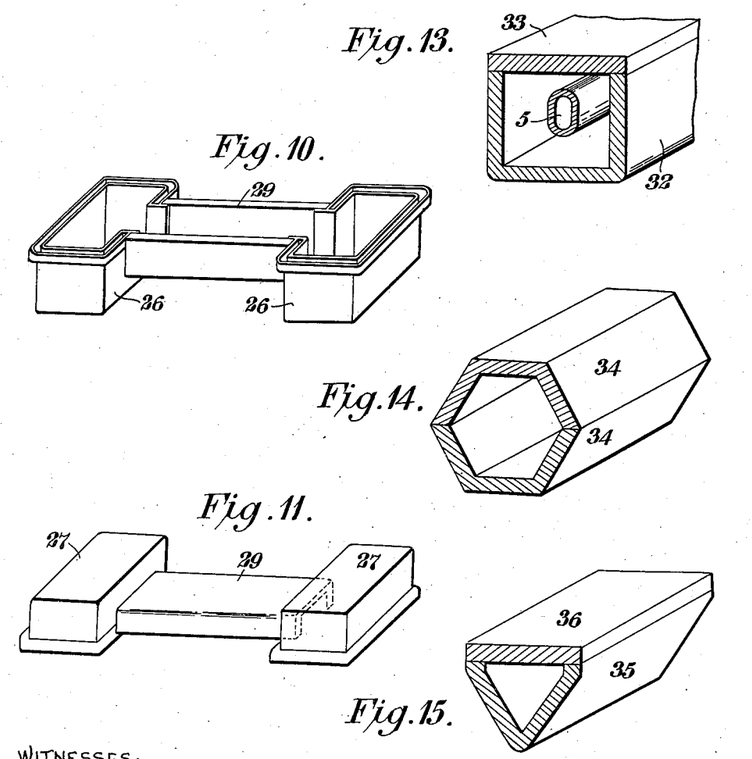

The lamp chamber hereinbefore described is capable of various modifications and a useful form of construction is shown in Fig. 9 in which the lamp 5 is supported in a lamp chamber comprising a lower portion 26 and an upper portion 27. Enlarged portions constructed of metal or other suitable material surround the end portions of the lamp. Surrounding the middle portion of the lamp is a tubular window 29 permeable to ultra-violet rays which may be constructed of quartz or other suitable material. The lamp chamber may be strengthened by means of bolts 28 which hold the enlarged portions tightly against the tubular portion 29. This chamber containing the lamp may be entirely immersed in the liquid which is being sterilized and in order to start the lamp into operation it is sufficient to tilt one end of the lamp chamber, or if desired provision can be made for tilting the lamp inside the box. Figs. 10 and 11 show the bottom and top sections respectively of the lamp chamber shown in Fig. 9. If it is desired to create a vacuum in the lamp chamber it is necessary to make hermetically tight joints where the sections are fitted together. This can be done by providing a groove as shown in Fig. 10 in the edges of the two sections which can be filled by a cord of rubber 30 or other suitable packing material slightly larger than the space which it is intended to occupy. When the sections are fitted together and screwed up tightly the rubber or other packing material is compressed and forms a perfectly air-tight joint.

Instead of using plates or rock crystal, the light-emitting part of the lamp may be surrounded by an envelop of fused silica or quartz or channels cut out of rock crystal as shown for instance in Figs. 12, 13, 14 and 15. Fig. 12 shows an envelop composed of two super-imposed channels 31 of quartz of semicircular cross section adapted to receive the tube of the lamp 5. In Fig. 13 the channel is shown of rectangular cross section 32 and is provided with a flat piece 33 as a cover. The form shown in Fig. 14 is of hexagonal cross section constructed of two halves 34, while the form shown in Fig. 15 has a triangular cross section composed of the V-shaped portion 35 and the flat piece 36 covering the same. These tubular windows or envelops surrounding the lamp tube are mounted in the lamp chamber as shown in Fig. 9.

Figure 16:
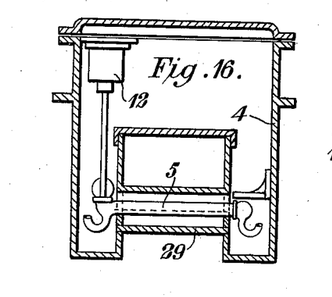
Fig. 16 shows in vertical section a modified construction of the lamp chamber which permits of the rays emitted in all directions being utilized.

Fig. 16 is a modified form of the lamp chamber shown in Fig. 4 which is adapted to emit rays throughout an angle of 360°.

It will be obvious from an examination of the drawings that in each form of construction practically all the ultra-violet rays emitted by the lamp are utilized. There will be comparatively little absorption of the rays by the air in the lamp chamber, because the quartz windows are arranged as close as possible to the lamp tube although if desired the lamp chamber may be exhausted so that no absorption will take place at all. In the form of construction shown in Figs. 1 and 2, the lamp 5 may be surmounted by a reflector if desired. When a device is used for automatically closing the lamp circuit when the flow of water through the apparatus commences, it is desirable to so determine the power of the lamp in relation to the size of the sterilizing chamber that no unsterilized water shall leave the apparatus. This object can be achieved by making the sterilizing chamber large in relation to the maximum amount of water flowing through the apparatus.

Figure 17:
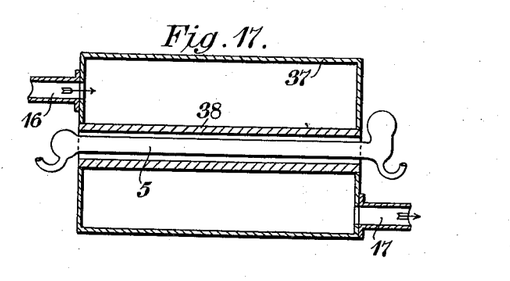
Fig. 17 shows in vertical section a sterilizing chamber provided with a tubular lamp chamber.

In the apparatus shown in Fig. 17 the sterilizing conduit 37 is provided with a tubular window 38 which is mounted transversely in the same. This window may be cylindrical in shape or may have any of the modified shapes shown in Figs. 12 to 15. The lamp 5 is located so that the tubular part of the lamp is surrounded by the window 38, it being necessary to insert the lamp before the sterilizing element is erected. The water passes through the same, entering at 16 and leaving at 17 and during its passage through the tank is exposed to the ultra-violet rays which penetrate through the window.

Figure 18:
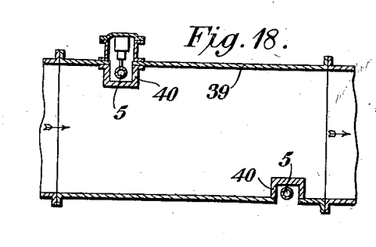
Fig. 18 shows in vertical section a sterilizing conduit provided with channels permeable to ultra-violet rays adapted to receive a part of the lamp which emits such rays and Fig. 19 is a modified form of this apparatus shown in section which is provided with baffle plates for regulating the speed of the liquid.

The form of construction shown in Fig. 18 comprises a sterilizing conduit 39 of circular cross section with channels 40 constructed of quartz or other material permeable to ultra-violet rays mounted transversely in the conduit. These channels are adapted to receive the tubular portion of the lamp 5 and the water passing through the conduit is exposed to the ultra-violet rays which penetrate through the quartz channels and is rapidly sterilized. Any number of these channels may be provided according to the rapidity of the flow of water through the conduit.

Figure 19:
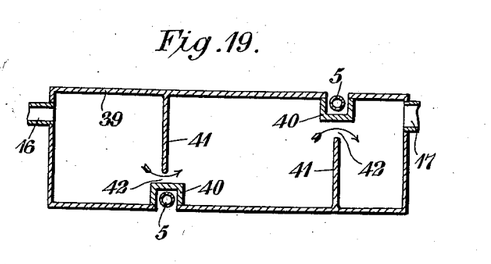
Figure 20:
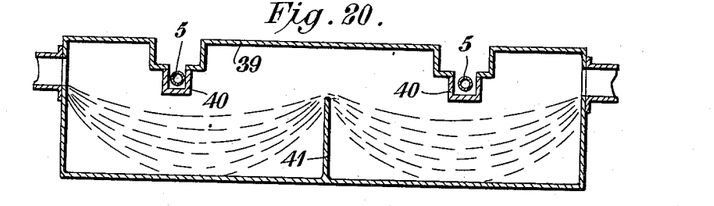
Fig. 20 is a vertical sectional view showing another modified form of construction.
Figure 21:
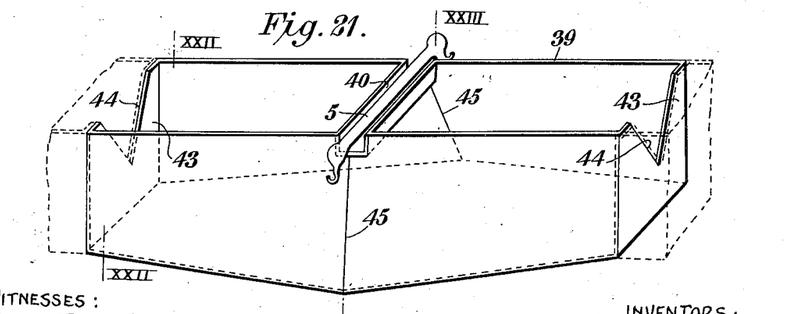
Figure 22:
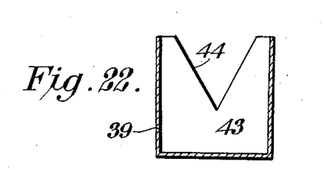
Figure 23:
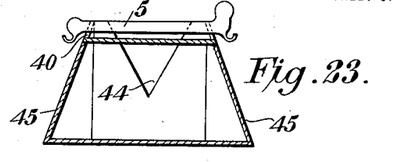
Fig. 23 is a cross section on the line XXIII—XXIII Fig. 21.

As hereinbefore mentioned, in order to obtain the greatest efficiency it is desirable to so arrange the apparatus that the speed of the liquid flowing close to a lamp is greater than liquid which is flowing more remote from said lamp. The apparatus should therefore be designed so that the time of exposure is regulated in accordance with the distance of the liquid from the lamp. Fig. 19 shows a method of accomplishing this object. Opposite each of the channels 40 in which the lamp tube is mounted a baffle plate 41 is arranged with passages 42 near to the channels 40. The liquid, as it flows through the openings where the cross section is reduced, will have a greater speed than in the main portion of the conduit. Fig. 20 shows a modified form of construction in which baffle plates 41 are mounted midway between the adjacent lamp channels 40 and the liquid flowing above the baffle plates and just below the lamp channels will have a greater speed than that flowing at the bottom of the recesses between adjacent baffle plates 41. By this means the speed of the liquid in different parts of the conduit is so regulated that all parts of the liquid are exposed for a sufficient period of time to become sterilized without any part being subjected to an excessive expenditure of energy. Another form of apparatus for achieving this object is shown in Figs. 21, 22 and 23 in which the sterilizing chamber comprises a trough or conduit 39 through which the liquid to be treated is caused to flow. The lamp 5 is supported in a channel 40 which is constructed wholly or in part of a material such as quartz which is permeable to the ultra-violet rays. If it is assumed that the part of the lamp which emits the rays in the greatest concentration is located approximately over the middle of the conduit, the liquid at the surface immediately below the middle of the lamp will be exposed to rays of greater activity than the liquid at the sides and bottom of the conduit. In order to cause the liquid near the surface to flow more rapidly than the liquid at the bottom of the trough, baffle plates 43 having a triangular notch or gate 44 therein are arranged in the conduit the apex of which is situated in the lower part of the baffle plate as shown. The upper part of the liquid will flow through the wide opening at a greater speed than the lower part of the same, which flows through the reduced opening and where greater friction is offered to the progress of the current of liquid. The cross section of the conduit immediately below the lamp is trapezoidal in form, as shown in Fig. 23, that is to say, the sides 45 converge toward the lamp channel 40. Where the baffle plates are located the cross section of the conduit is rectangular and the cross section gradually changes from a trapezoid to a rectangle and vice versa between the position of the lamp channel and baffle plates. Since in the neighborhood of the lamp the conduit is wider at the bottom than it is at the top the liquid will flow more rapidly just below the lamp than at the bottom which is farther from the lamp and where the ultra-violet rays are less effective.

Figure 24:
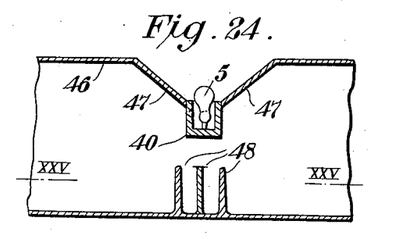
Fig. 24 shows a modified form of construction in sectional elevation, Fig. 25 being a section on the line XXV—XXV of Fig. 24.
Figure 25:
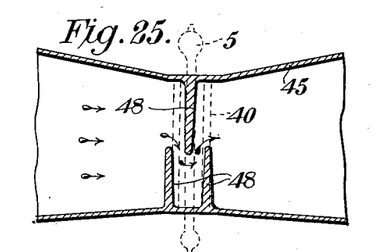

In the form of construction shown in Fig. 24 the cover of the sterilizing conduit 46 slopes down, as shown at 47, toward the lamp channel 40. The bottom of the chamber is provided with corrugations or baffle plates 48 which provide a circuitous path for the liquid flowing at the bottom of the conduit, as shown in Fig. 25. Thus the liquid flowing immediately under the lamp has a free passage whereas liquid at the bottom of the trough is obstructed by the corrugations or baffle plates and caused to flow slowly.

It will be obvious that other methods of achieving the same results may be devised and that two or more of the above methods for regulating the speed of the liquid may be combined, depending upon the nature of the liquid to be treated by means of ultra-violet rays and the time of treatment necessary. We therefore do not limit ourselves to the particular forms of construction above described which are only intended to illustrate and explain the nature of our invention, and we wish it to be understood that reasonable developments and modifications of such constructions fall within the scope of the same.

Figures 26, 27, 28:
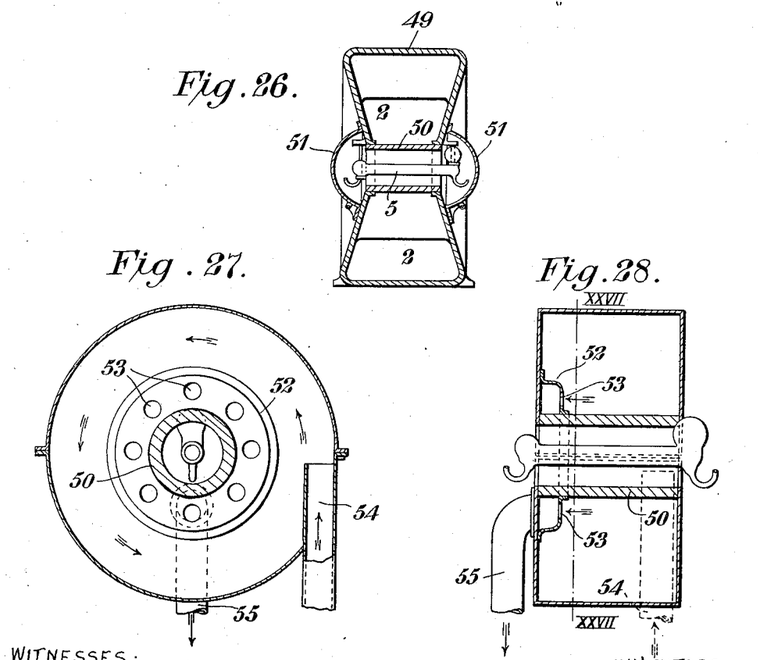

Fig. 26 is an end view in sectional elevation of a modified form of the apparatus shown in Fig. 6. A drum 49 of cylindrical shape is provided with a lamp chamber 50 located axially in the same and the tubular part of quartz or other material permeable to the ultra-violet rays surrounds the tubular part of the lamp 5. Sufficient space is allowed to permit of the lamp being tilted for the purpose of starting. As shown the tubular window is somewhat shorter than the drum and the side walls of the latter converge toward the former. Hinged covers 51 are provided for the ends of the lamp as shown. In other respects the construction is similar to that shown in Fig. 6, baffle plates being provided alternately mounted on the circumference of the drum and the lamp chamber.

A modified form of construction is shown in Figs. 27 and 28, in which an auxiliary chamber 52 communicating with the delivery pipe 55 with apertures for the entry of the liquid is provided inside the main drum. Owing to the position of the inlet pipe 54 being tangential to the circumference of the drum the water is compelled to take a rotary path around the tubular window 50. The apertures 53 in the auxiliary chamber are located near the axis of the drum. If desired the direction of flow of the liquid through the apparatus may be reversed. By locating the inlet pipe at one end of the drum and the outlet pipe at the other, as shown in Fig. 28, the liquid not only takes a rotary path around the tubular window but this rotary motion is modified in that the liquid takes a spiral course.

Throughout this specification we have used the term sterilization in connection with apparatus suitable for carrying out this object, but we wish it to be understood that our invention covers the use of the various forms of apparatus herein described and all the modifications thereof which are included within the limitations of the appended claims for treating liquids generally with ultra-violet rays.

What we claim is:

1. The combination with a receptacle for containing a liquid to be treated by ultra-violet rays of a treating chamber with walls composed of material, such as quartz, which is permeable to such rays, contained in or extending through the receptacle, and a source of ultra-violet rays, such as a mercury vapor lamp adapted to be inserted or removed from the treating chamber.

2. The combination with a receptacle for containing liquid to be treated by ultra-violet rays, of a treating chamber having solid walls which are permeable to such rays, extending into and forming a part of the receptacle and a source of ultra-violet rays such as a mercury vapor lamp adapted to be inserted in or removed from the said treating chamber.

3. In apparatus for treating liquids by ultra-violet rays, the combination with a receptacle for containing the liquid, a treating chamber located within and removable from the same, and having solid walls which are permeable to ultra-violet rays, and a source of ultra-violet rays, supported within but removable from the said chamber.

4. In an apparatus for treating liquids by ultra-violet rays, the combination of a receptacle for containing the liquid to be treated, a lamp chamber supported therein, and having solid walls which are permeable to ultra-violet rays, a mercury vapor lamp removable from said chamber, and baffle plates in the main receptacle arranged so as not to intercept the rays from the lamp but to direct the liquid flowing through the receptacle toward and from the walls of the lamp chamber.

5. In apparatus for treating liquids by ultra-violet rays, the combination of a receptacle through which the liquid flows while undergoing treatment, a lamp chamber located within the same, and having solid walls permeable to ultra-violet rays, a mercury vapor lamp constituting a source of such rays supported within the lamp chamber and baffle plates arranged within the receptacle in such relation to the lamp chamber as not to intercept the rays but to cause the liquid to flow toward and from the lamp chamber and in thinner streams over the surface of the same than at points more remote therefrom.

In testimony whereof we have hereunto subscribed our names this tenth day of May 1913.

VICTOR HENRI.
ANDRÉ HELBRONNER.
MAX von RECKLINGHAUSEN.

Witnesses:
HANSON C. COXE,
JOHN BAKER.